(12) United States Patent
Soccard

(10) Patent No.: US 7,914,272 B2
(45) Date of Patent: Mar. 29, 2011

(54) DEVICE FOR STRETCH-FORMING FLEXIBLE PREIMPREGNATED BANDS

(75) Inventor: Eric Soccard, Carquefou (FR)

(73) Assignees: European Aeronautic Defence and Space Company, Eads (FR); Dassault Aviation, Argenteuil (FR)

( * ) Notice: Subject to any disclaimer, the term of this patent is extended or adjusted under 35 U.S.C. 154(b) by 364 days.

(21) Appl. No.: 11/792,151

(22) PCT Filed: Dec. 2, 2005

(86) PCT No.: PCT/FR2005/051031
§ 371 (c)(1),
(2), (4) Date: May 31, 2007

(87) PCT Pub. No.: WO2006/059051
PCT Pub. Date: Jun. 8, 2006

(65) Prior Publication Data
US 2008/0085335 A1     Apr. 10, 2008

(30) Foreign Application Priority Data
Dec. 2, 2004   (FR) .................................. 04 52843

(51) Int. Cl.
*B29C 70/32* (2006.01)
(52) U.S. Cl. .................. 425/174.4; 425/363; 425/508; 156/272.8; 156/380.9
(58) Field of Classification Search ............. 425/174.4, 425/363, 508; 156/189, 272.8, 380.9
See application file for complete search history.

(56) References Cited

U.S. PATENT DOCUMENTS

| | | | |
|---|---|---|---|
| 4,569,716 A | 2/1986 | Pugh | 156/574 |
| 4,882,007 A | 11/1989 | Lengen et al. | 156/523 |
| 5,078,821 A * | 1/1992 | Garvey et al. | 156/282 |
| 5,176,785 A | 1/1993 | Poyet et al. | 156/574 |
| 5,266,139 A * | 11/1993 | Yokota et al. | 156/169 |
| 6,451,152 B1 | 9/2002 | Holmes et al. | 156/272.8 |
| 6,540,000 B1 * | 4/2003 | Darrieux et al. | 156/523 |
| 6,799,619 B2 * | 10/2004 | Holmes et al. | 156/380.9 |

FOREIGN PATENT DOCUMENTS

| | | |
|---|---|---|
| DE | 3743485 A1 | 7/1989 |
| FR | 2692520 A1 | 12/1993 |
| FR | 2785623 A1 | 5/2000 |

OTHER PUBLICATIONS

International Search Report, PCT/FR2005/051031, pp. 6, (Mar. 31, 2006).

* cited by examiner

*Primary Examiner* — James Mackey
(74) *Attorney, Agent, or Firm* — Nixon Peabody LLP

(57) ABSTRACT

The system for stretch-forming composite material bands (3) includes, in addition to an unrolling head (20), an original assembly composed of a light source (4) for heating the band (3) and hardening the composite and a pair of rollers (6a and 6b) applying the desired pressure to assemble the band to a laminated composite (2) already deposited or applying it to the support (1). As the application of heat is concentrated at a distance from the rollers (6a and 6b) and with a perpendicular incidence, the rollers can be conveniently made of an elastic material, which enables them to adapt to the transverse curvature of the support equipment (1) and to apply a uniform pressure.

8 Claims, 2 Drawing Sheets

DEVICE FOR STRETCH-FORMING FLEXIBLE PREIMPREGNATED BANDS

CROSS REFERENCE TO RELATED APPLICATIONS or PRIORITY CLAIM

This application is a national phase of International Application No. PCT/FR2005/051031 entitled "Device For The Drape Forming Of Pre-Impregnated Flexible Bands", which was filed on Dec. 2, 2005, which was not published in English, and which claims priority of the French Patent Application No. 04 52843 filed Dec. 2, 2004.

The subject of this invention is a device for stretch-forming flexible preimpregnated bands.

The invention relates to the production of composite parts with complex shapes of any type requiring a good supply of heat using a mode of heating with an energy source directed toward a preimpregnated band, and in which means for applying pressure comprised of rollers ensures the shaping of the band on its support.

The composite structures constituted by long fibre reinforcements and a polymer matrix are generally produced with superimposed preimpregnated bands draped in appropriate directions manually or automatically. The preimpregnated bands are subjected to a final hardening transformation cycle called polymerisation for thermosetting resins and consolidation for thermoplastic resins. To reduce the cycles and operation costs, it is desirable to reduce the number of steps of production of the parts. It is thus possible to produce, in a single step, the structure by simultaneously depositing and hardening the preimpregnated band. The current deposit heads use the association of a system for unrolling and guiding the material, a cutting system, a heating system for the hardening and a compacting pressure application system for ensuring the stretch-forming of the preimpregnated band in the support. Some examples are described in the patents U.S. Pat. Nos. 6,451,152 B1, 6,390,169 B1 and EP 1,334,819 A1.

We are particularly interested here in the heating system and the pressure application system. Known heating systems include means for blowing pulsed hot air or nitrogen, which have the disadvantages of oxidizing the resins and resulting in poor adherence of the folds of the structure. The heating area is wide and extends to the pressure application roller, which makes it necessary to use a heat-resistant metallic roller, although such rigid rollers are unsuitable for complex shapes of variable curvature. The surrounding device is exposed to various kinds of thermal pollution (degradation of materials, etc.). The heat sources are not easily reproducible and the external environment has an effect: it is difficult to ensure the regularity and uniformity of the heating.

Other heating systems include lasers or diodes providing more specific and concentrated heating; but the aforementioned disadvantages remain, since the energy beam is directed substantially toward the roller, so as to produce the heating and hardening where the preimpregnated band is pressed on the support, and the roller is therefore strongly heated. In addition, the beam is generally directed obliquely so as to reach the preimpregnated band under the roller. It is thus observed that the position of the exhaust area is dependent on the curvature of the support, and that the heating conditions are therefore not constant over the length of the preimpregnated band.

The invention attempts to improve the quality of the parts and reduce the cycles and associated costs of transforming the material. The problems currently encountered are solved, and the deposition of a flexible preimpregnated band of any width on complex shapes can be fully automated, and the application of pressure is automatically made uniform.

The energy source used can be optical and consist of a YAG-type laser or a diode battery, and the energy beam according to the invention will be directed substantially perpendicular to the material to be deposited. In addition, it will pass between two rollers. The perpendicular incidence of the light beam guarantees the uniformity and constancy of the energy density provided.

The hardening of the band and its integration in the laminated composite already deposited, if it exists, are achieved by heat conduction, in the thickness of the band, of the surface energy provided by the energy source. The local provision of heat provides the advantage of eliminating all thermal pollution problems and overheating of the device and the pressure application rollers.

The optical beam will be adapted to the width of the band of the material to be deposited and can be transformed by a set of diverging and converging lenses giving a focused spot or not. A variable set of diodes or a galvanometric scanning of the beam will also make it possible to adjust the width of the band. An attempt will be made to guarantee the constancy and uniformity of the energy density applied to the band to be deposited. A mask can also be used with the effect of neutralising the lateral disturbances of the optical signal produced by the laser itself or by its optical transformation.

In general, the use of means providing a wider distribution of heat in the transverse direction than in the longitudinal direction of alignment of the rollers, or even simply the narrow distribution in the longitudinal direction, such as a laser beam or a diode, a laser beam or diode array, a mask, a scanning device, and so on, make it possible to more easily use the deformable rollers in this method in which the heating is simultaneous to the pressure application, since the heating, while being sufficient to ensure polymerisation, remains low under the rollers, so that it is impossible to produce in a material as resistant as rigid rollers. The rollers can therefore be arranged with a relatively small spacing so as to satisfy their function of shaping the band.

The surface energy density can also be controlled by a pyrometer adjusted to the emissivity of the polymer and regulated by a PID-type algorithm.

A nitrogen stream can be projected constantly at the surface of the material affected by the beam using a nozzle with a predefined width and opening and a flow adapted to make the ambient environment of impact of the optical beam anaerobic. The oxidation of the polymers is thus eliminated.

Another essential aspect of the invention relates to the pressure application system. It comprises two deformable rollers that make it possible to ensure band tension, placement of the band on the laminated composite already deposited or the equipment serving as a support, substantially perpendicular positioning of the band with respect to the optical beam and the application of isostatic pressure to be adjusted according to specific needs. The rollers on each side of the energy beam make it possible to apply a uniform pressure to a large surface of the preimpregnated band, in particular between them, where the beam falls, while being conveniently arranged farther from the beam than in the ordinary designs. They are therefore subjected to less heating, which makes it possible to transform them into a deformable material such as an elastomer. They thus adapt to the local variations in curvature of the deposit equipment, without any compromise in the uniformity of the pressure that they apply.

To summarise, the invention in its most general form relates to a device for stretch-forming flexible bands preimpregnated with resin, including means for heating the band and means for applying pressure on the band, characterised in that the means for applying pressure include two rollers with parallel shafts applied successively on each portion of the band, wherein the rollers have a surface made of an elastic material, and in that the heating means are arranged between the rollers and are suitable for providing thermal radiation substantially perpendicular to the band between the rollers.

The invention will now be described in association with the figures.

Figure 1:
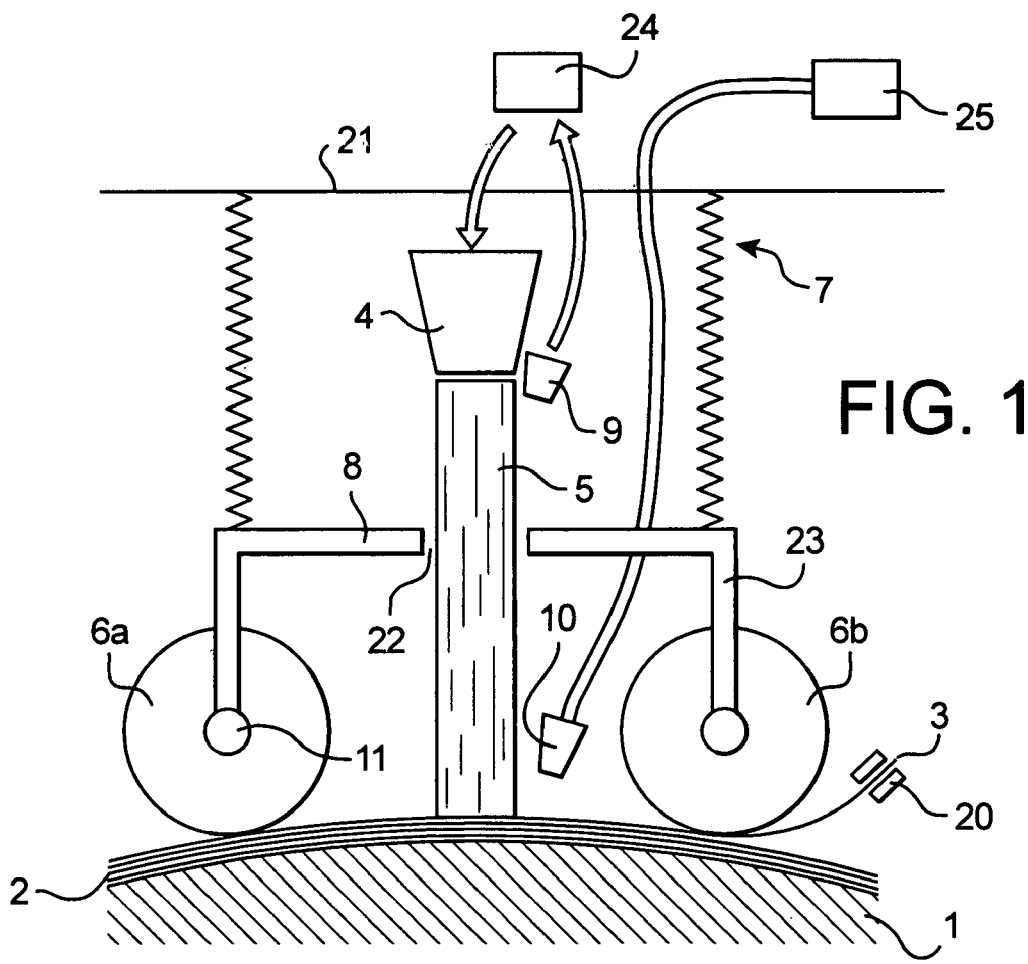
FIG. 1 is a general side view of an embodiment of the invention.

The description relates first to FIG. 1. Deposit equipment 1, i.e. a support for the part to be produced and conferring its shape thereon, is provided. A laminated composite 2 or pre-impregnated band has already been deposited on its surface. A flexible preimpregnated band 3 to be deposited or consolidated is moved forward over the composite 2 by means of an unrolling system 20 of a known type. A light energy source 4 is directed toward a section of the band 3 to be deposited. The source 4 can be a YAG-type laser or diodes. The beam that it emits is denoted by reference 5; it is directed substantially perpendicularly to the band 3 where it reaches it.

Figure 2:
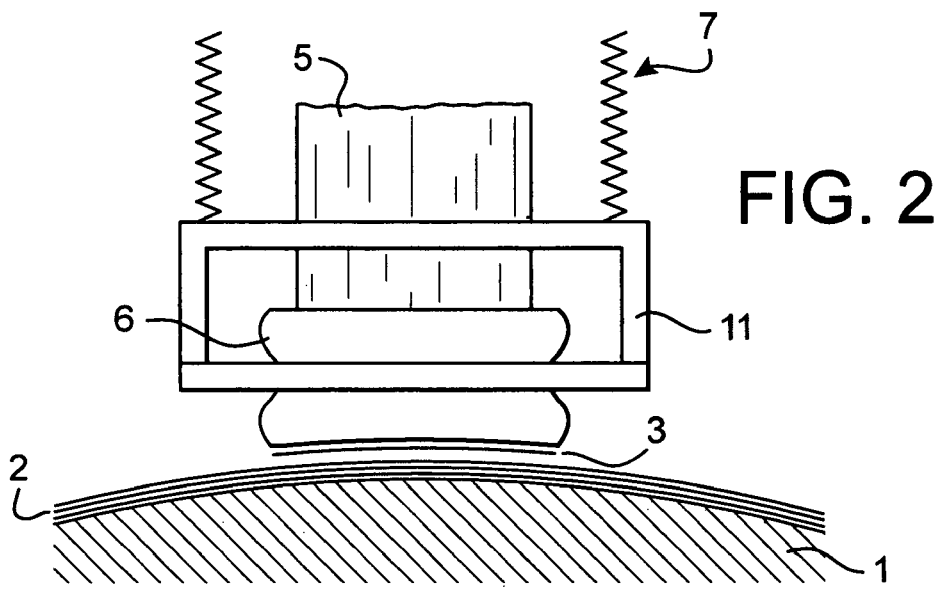
FIG. 2 is a front view of the embodiment of FIG. 1, and FIGS. 3, 4 and 5 show certain embodiments of the invention.

A pair of rollers 6a and 6b is arranged in front and in back of the beam 5 in consideration of a forward direction of the device on the equipment 1 (at the right-hand side in FIG. 1). The rollers 6a and 6b with rigid parallel shafts are made of a deformable elastomer and therefore adapt to local variations in curvature of the equipment 1, in particular in the transverse direction, as shown in FIG. 2; a uniform pressure is maintained around the rollers 6a and 6b and between them over a relatively large surface of the band 3. A pushing system 7 is provided on the rollers 6a and 6b; it can consist of springs compressed between an upper plate 21 and a support of the rollers 6a and 6b, which can be composed of a mask 8 provided with an opening 22 delimiting the cross-section of the beam 5 and bars 23 connected to the mask 8 and supporting the rigid shafts 11 of the rollers 6a and 6b. The device in this case also includes pyrometer control means 9 associated with means 24 for regulating the optical energy source 4, for example by a PID control algorithm. It also includes a nitrogen stream propulsion system such as a nozzle 10 connected to a container 25 and placed between the rollers 6a and 6b. All of these elements, except for possibly the container 25 and the regulation system 24, are connected to one another or to the plate 21 and moved together on the equipment 1 by means not shown, capable of consisting of a robot arm or a mobile support unit.

Figure 5:
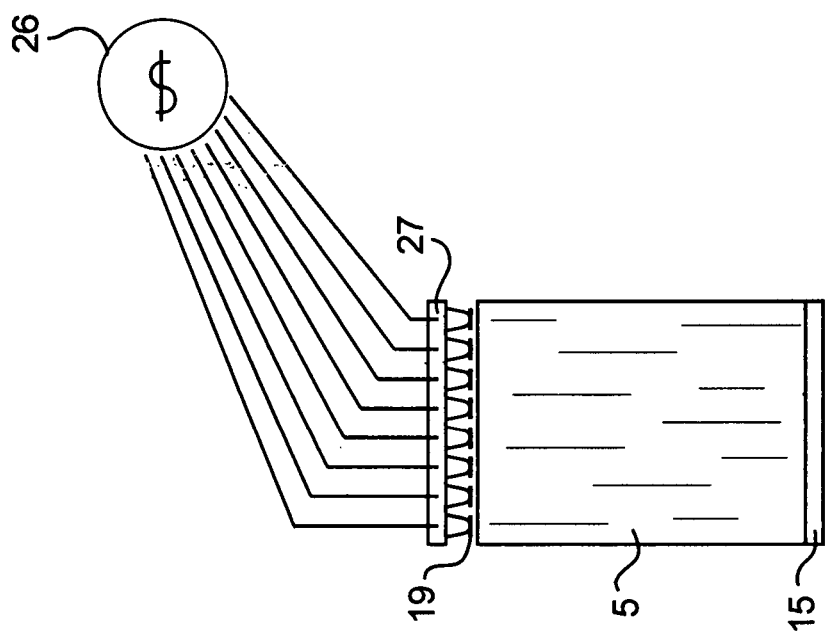
Figure 4:
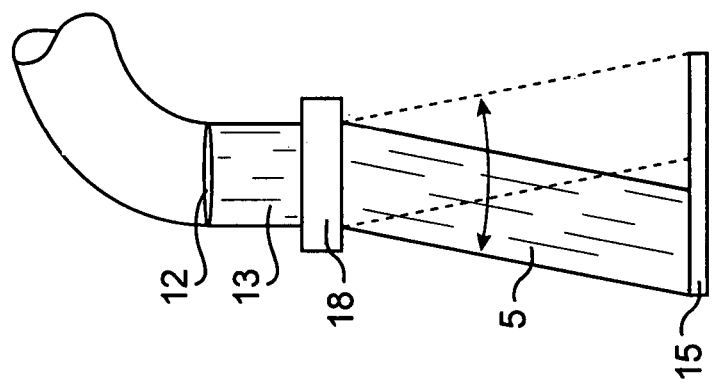
Figure 3:
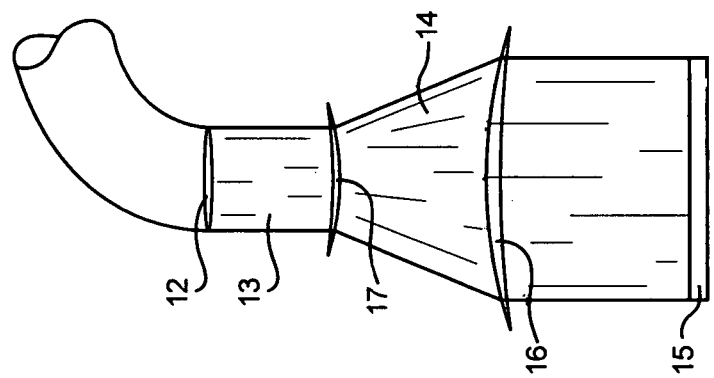

We will now describe FIGS. 3, 4 and 5. These figures show that the beam 5 can be emitted from the end of an optical fibre 12. The beam in this case is denoted by reference 13, but does not differ from beam 5. It can be enlarged and reduced by a pair of lenses including a lens 16 converging in a longitudinal or forward direction of the device and a lens 17 diverging in the transverse direction, which results in an enlargement 14 of the beam 13 followed by a reduction 15 in the other direction, and in the end a very elongated spot. Alternatively, it is possible to use a galvanometric scanning system 18 with the optical beam 13, which is shown in FIG. 4, so as to scan the band 3 transversely over the entire desired width, which can of course be adjusted. Other lens arrangements can be envisaged.

FIG. 5 shows an array of luminescent diodes 19 all associated with a common source 26 and of which the number, and therefore the width of the array, can be varied, for example by gluing new ones onto a rail 27 integrated with the plate 21.

The rollers made entirely of elastomer can be replaced by rollers of the same size including a hard central core, for example metallic, and only one flexible peripheral band.

The invention claimed is:

1. Device for stretch-forming flexible bands preimpregnated with resin, comprising:
    means for heating the band; and
    means for applying pressure on the band, wherein the means for applying pressure includes two rollers with parallel shafts applied successively on each portion of the band, and the heating means are arranged between the rollers and are capable of providing thermal radiation substantially perpendicular to the band between the rollers, characterised in that the heating means including a laser, or a diode array, and in that the rollers have a surface made of elastic material; and
    a device for scanning a beam produced by the heating means in a transverse direction with respect to a forward direction of the rollers.

2. Stretch-forming device according to claim 1, characterised in that the stretch-forming device includes a mask arranged above the rollers and below the heating means and provided with an opening for delimiting the cross-section of the radiation.

3. Stretch-forming device according to claim 1, characterised in that the heating means includes at least one lens for adjusting the size of the beam.

4. Stretch-forming device according to claim 1, characterised in that the rollers include a metallic core surrounded by an elastomer band.

5. Stretch-forming device according to claim 1, characterised in that the stretch-forming device includes a system for servo adjustment of the power of the heating means.

6. Stretch-forming device according to claim 1, characterised in that the stretch-forming device includes elastic means for pushing the rollers toward equipment for supporting the band.

7. Stretch-forming device according to claim 1, characterised in that stretch-forming device includes means for blowing gas on the band between the rollers.

8. Stretch-forming device according to claim 3, characterised in that the rollers include a metallic core surrounded by an elastomer band.

* * * * *